June 19, 1951     J. KOVACEVICH     2,557,506
PRUNING SHEARS
Filed Aug. 30, 1946
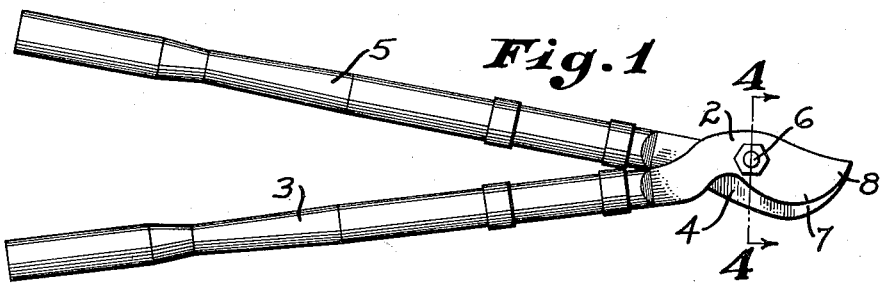
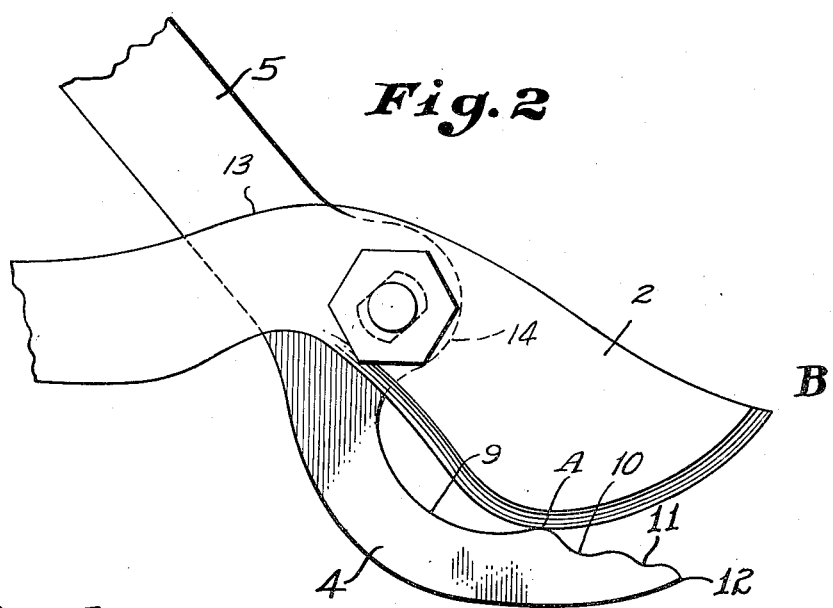
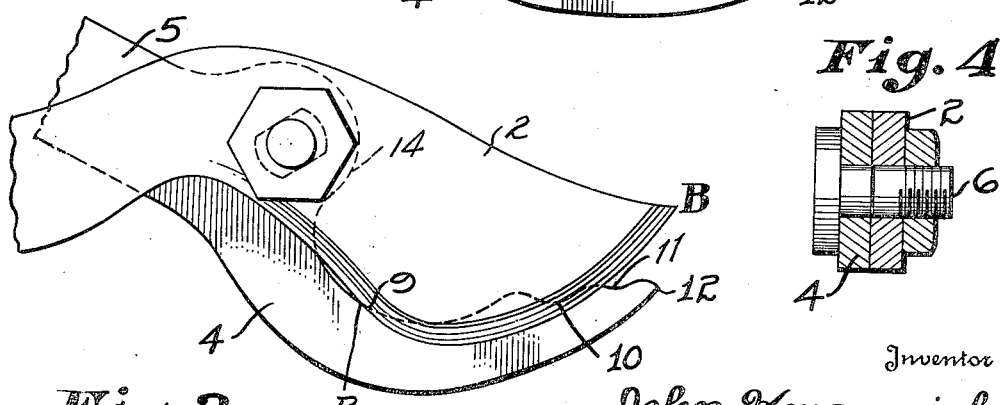
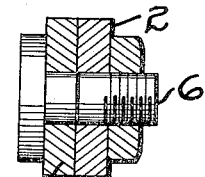
Inventor
John Kovacevich
By Lyon & Lyon
Attorneys Patented June 19, 1951

2,557,506

UNITED STATES PATENT OFFICE 2,557,506

PRUNING SHEARS

John Kovacevich, Los Angeles, Calif.

Application August 30, 1946, Serial No. 694,022

2 Claims. (Cl. 30—259)

This invention relates to improvements in pruning shears, and particularly to the type of pruning shears which are used for cutting large limbs or stock from trees, hedges, or heavy shrubbery.

The major object of the present invention is to provide a form of pruning shears which are well adapted for use on relatively large limbs or heavy shrubbery and are adapted for cutting the same with greater ease than has been possible with the shears now on the market.

The pruning shears of the present invention are so constructed and arranged as to attain a novel type of cutting action. The ordinary pruning shears operate in cutting almost exclusively on a purely scissor action; that is to say as the shears close the meeting point of the two blades of the shears move uniformly outward along each of the blades, the cutting action being obtained principally by what may be described as a progressive pinching of the branch between the edges of the blades. The ordinary shears have the disadvantage that with this type of cutting action considerable force is required to cut the limb or stock being operated upon, and this force results in a reaction from the shears which is applied in a direction tending to bend the limb or stock from the shears. As a result, in the operation of the pruning shears on a heavy or tough limb or stock the action of closing the shears may result merely in ejecting the limb or stock from the shears, rather than severing the same.

As distinguished from the normal pinching type of cut, the shears of the present invention produce what I refer to as a "slicing action." By "slicing action" I have reference to the fact that over at least a portion of the zone of operation of the shears the points of cooperation between the blades move along one blade more rapidly than along the other blade as the shears are closed, so that in addition to a mere pinching action there is a slicing effect of the blade on the limb or stock to be cut. By this slicing action the force required to sever the limb or stock is considerably reduced. Furthermore, the shears of the present invention differentiate from the ordinary pruning shears in that the blades are designed and arranged so that during at least a portion of the cutting action the reaction of the blade on the limb or stock to be cut is applied in a direction tending to pull the limb or stock into the shears, rather than eject the same from the shears. Because of this novel cutting action the cutting of heavy limbs or stock is greatly facilitated through the use of the shears of the present invention.

These novel cutting actions of the shears of the present invention are created by providing the shears with two cutting blades, one cutting blade having a scimitar form and being broad and short, the contact cutting edge extending from one side along the end of the blade. The other cutting blade is a concave cutting member having at least one, and preferably a plurality, of concave curves thereon. The major portion of the concave cutting member is occupied by the inner concave cutting surface, which is shaped and arranged to cooperate with the opposed scimitar blade so that on closing the shears the initial point of closure is at the outer end of the concave surface and moves progressively inwardly as the shears are closed. Each of the several cavities of the concave cutting member of the present invention operates as a separate means for holding and retaining a limb or stock in the shears while the same is being cut, the outer and smaller concavities being adaptable for cutting the smaller limbs and stock but the inner and main concavities being adapted for gripping the larger limbs or stock.

Also contributing to the novel cutting action of the shears of the present invention is the manner of pivoting the cutting blades. The pivot point is displaced slightly laterally from the axis of the handles and for this purpose the scimitar form blade is provided with a return bend, the pivot point being in this return bend, the other blade having a lateral enlargement for the pivot point so as to place the pivot point at the same side of both handles.

The pruning shears of the present invention, together with objects and advantages of the invention, will be more fully understood from the following description of a preferred form of the shears of the present invention as given in connection with the accompanying drawings, in which:

Figure 1 is a plan view of the shears.

Figure 2 is an enlarged fragmentary view of the blades, illustrating one of the relative positions thereof.

Figure 3 is a similar view, representing another relative position of the blades.

Figure 4 is a fragmentary section on the line 4—4 of Fig. 1.

Referring to the drawings, 2 is a cutting blade attached to the handle 3 and 4 is a cutting blade attached to the handle 5. The two blades are pivoted together by a pivot bolt 6.

The cutting blade 2 is of scimitar shape; that is, curved convexly along one side 7 and around the outer end, as indicated at 8 the convex curve 7, 8 being provided with a suitable cutting edge. The blade 2 is also bent laterally as indicated at 13, and then returned inwardly so that as viewed, for example, in Figure 1, the pivot point 6 lies upwardly slightly from the axis of the handle 3 on the opposite side from the cutting edge 7. The other cutting blade 4 is a concavely edged blade, the greater area of the cutting surface from the fulcrum outwardly of the blade 4 being provided by the concave edge 9 and there being two other relatively small concavities 10 and 11 outwardly toward the end 12 of the blade. The blade 4 is of sufficient length so that in closed position the ends 12 and 8 substantially coincide. The curvature of the blades 4 and 2 are shaped as illustrated to produce the novel cutting action of the present invention. This cutting action may be seen more clearly by a comparison of Figs. 2 and 3 of the drawings. Fig. 2 illustrates how, as the blades 2 and 4 are closed, the meeting point of the blades comes first at A, the outer end of the concave cutting surface 9, and comparison of Fig. 2 with Fig. 3 will show how the meeting point of the blades in the closing action has been transferred progressively in the direction of the fulcrum to the point B. Shears having such a type of closing action tend in all positions of the shears to better hold the limbs or stock to be cut, and in some positions, at least, have the effect of crowding the limb or stock to be cut towards the fulcrum of the shears as the shears close. This type of action may not be necessary over the entire range of operation of the shears and is of particular value only in cutting the larger or heavier limbs or stock. In order to achieve this cutting action, the radius of curvature of the convex cutting blade 7 in the area through which it cooperates with the concave cutting edge 9 should be greater than the radius of curvature of the concave edge 9. In order to contribute to this action, the handle 5 is given the offset 14 in which the pivot point of this blade is located, so that as illustrated the pivot point 6 of the two blades lies above the two axes of the handles 3 and 5, as viewed in Figure 1.

For cutting the lighter limbs or stock, the small notches shown at 10 or 11 are satisfactory, and it will be noted that the meeting point of the shears 2 and 4 along the concavities 10 and 11 move outwardly as the shears are closed. It is to be further noted, however, that the point of contact of the blades 2 and 4 moves outwardly around the cutting edge 7 of the blade 2 at a more rapid rate than it does along the blade 4. It is this action which is responsible for the slicing effect and rapid cutting action of the shears of the present invention.

While the particular forms of the shears herein described are well adapted to carry out the objects of the present invention, it is to be understood that the invention includes all such modifications and changes as come within the scope of the appended claims.

I claim:

1. A pruning shears comprising a cutting blade mounted on each handle, one cutting blade having a return bend to provide a pivot point offset from the axis of its handle, said blade having a convex cutting edge on the opposite side of the axis of its handle from said return bend, the tip of which convex cutting blade is substantially aligned with the axis of the handle mounting the same, the other cutting blade likewise having a pivot point offset from the axis of its handle on the same side of the handles as the first-mentioned pivot point, said second cutting blade having a convex cutting edge for cooperation with the concave cutting edge, the radius of curvature of the concave cutting edge being smaller than that of the convex cutting edge.

2. A pruning shears comprising a cutting blade mounted on each handle, one cutting blade having a return bend to provide a pivot point offset from the axis of its handle, said blade having a convex cutting edge on the opposite side of the axis of its handle from said return bend, the tip of which convex cutting blade is substantially aligned with the axis of the handle mounting the same; the other cutting blade likewise having a pivot point offset from the axis of its handle on the same side of the handles as the first-mentioned pivot point, said cutting blade having a convex cutting edge for cooperation with the concave cutting edge, the radius of curvature of the concave cutting edge being smaller than that of the convex cutting edge, the two cutting blades being so shaped and arranged that on closing, the meeting point between the blades occurs first at substantially the outer end of the said concave cutting edge and progresses inwardly towards the pivot points of said blades.

JOHN KOVACEVICH.

REFERENCES CITED

The following references are of record in the file of this patent:

UNITED STATES PATENTS

| Number | Name | Date |
|---|---|---|
| 103,197 | Kellogg | May 17, 1870 |
| 131,108 | McElhaney | Sept. 3, 1872 |
| 160,103 | Johnson | Feb. 23, 1875 |
| 1,520,529 | Cagle | Dec. 23, 1924 |